(12) United States Patent
Nishimura

(10) Patent No.: US 9,591,078 B2
(45) Date of Patent: Mar. 7, 2017

(54) MEDIA PROCESSING DEVICE AND POS SYSTEM

(71) Applicant: Seiko Epson Corporation, Tokyo (JP)

(72) Inventor: Hideki Nishimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 13/870,849

(22) Filed: Apr. 25, 2013

(65) Prior Publication Data

US 2013/0318145 A1    Nov. 28, 2013

(30) Foreign Application Priority Data

May 22, 2012 (JP) ................. 2012-116883

(51) Int. Cl.
G06F 15/16 (2006.01)
H04L 29/08 (2006.01)
G06F 3/12 (2006.01)

(52) U.S. Cl.
CPC .......... *H04L 67/125* (2013.01); *G06F 3/1206* (2013.01); *G06F 3/1247* (2013.01); *G06F 3/1291* (2013.01)

(58) Field of Classification Search
None
See application file for complete search history.

(56) References Cited

U.S. PATENT DOCUMENTS

| | | | |
|---|---|---|---|
| 5,678,029 A * | 10/1997 | Iijima | G06K 7/0008 710/65 |
| 6,369,909 B1 | 4/2002 | Shima | |
| 6,415,341 B1 * | 7/2002 | Fry et al. | 710/62 |
| 6,940,615 B1 | 9/2005 | Shima | |
| 7,184,154 B1 * | 2/2007 | Housel | B42C 19/02 358/1.13 |
| 8,033,452 B2 | 10/2011 | Koakutsu | |
| 8,215,544 B2 | 7/2012 | Koakutsu | |
| 2002/0181001 A1 * | 12/2002 | Klosterman | G06F 3/1204 358/1.11 |
| 2004/0090543 A1 * | 5/2004 | Suehiro | 348/231.99 |
| 2006/0197967 A1 * | 9/2006 | Snover | G06F 9/45512 358/1.13 |
| 2012/0243046 A1 | 9/2012 | Koakutsu | |

FOREIGN PATENT DOCUMENTS

| | | |
|---|---|---|
| JP | 07-186457 A | 7/1995 |
| JP | 11-184649 A | 7/1999 |
| JP | 2006-323445 A | 11/2006 |
| JP | 2009-199588 A | 9/2009 |

* cited by examiner

*Primary Examiner* — Esther B Henderson

(57) ABSTRACT

A system that controls and operates a plurality of media processing devices can also operate devices having different specifications. A multifunction device has a roll paper print unit; a first interface that receives data from a POS terminal; a conversion unit that converts a command contained in the received data to a first executable command that is executed by the roll paper print unit, or a second executable command that is executed by a printer; a second interface that sends the converted data to the printer; and a control unit that changes between a first operating mode in which the roll paper print unit executes the first executable command, or a second operating mode in which data including the second executable command is sent by the second interface to the printer.

7 Claims, 3 Drawing Sheets

MEDIA PROCESSING DEVICE AND POS SYSTEM

Priority is claimed under 35 U.S.C. §119 to Japanese Application no. 2012-116883 filed on May 22, 2012, which is hereby incorporated by reference in its entirety.

BACKGROUND

1. Technical Field

The present invention relates to a media processing device and a POS system.

2. Related Art

A printer as an example of a media processing device, and a POS (point-of-sale) systems having a plurality of printers, are known from the literature. See, for example, Japanese Unexamined Patent Appl. Pub. JP-A-2009-199588. In the system described in JP-A-2009-199588, a receipt printer (first printer) that prints receipts is connected to a POS register, and a label printer that prints labels is connected to the first (receipt) printer. When the POS register outputs transaction data, the receipt printer prints a receipt. The receipt printer also outputs print data for producing a label if a specific condition is met. The label printer then prints a label based on the print data for a label output by the receipt printer.

Systems such as disclosed in JP-A-2009-199588 that are configured using dedicated devices are designed so that the specifications of the individual devices are compatible with each other. However, when one of the devices is replaced or updated, problems, such as functionality being limited, can occur due to differences in commands or command sets. As a result, the cost and time required to replace a device may be increased by the need to update the command set or software used by other devices that are not replaced.

SUMMARY

The present invention is directed to solving this problem by enabling operating devices with different specifications in a system that controls and operates a plurality of media processing devices.

One aspect of the invention is a media processing device including: a processing unit that processes media; a first connection unit that receives data including a command sent from a host computer; a conversion unit that converts a command contained in the data received by the first connection unit to a first executable command executed by the processing unit, or a second executable command executed by an external processing device; a second connection unit that sends data including the second executable command output by the conversion unit to the external processing device; and a control unit that, based on the command converted by the conversion unit, switches to a first operating mode in which the processing unit executes the first executable command, or a second operating mode in which data including the second executable command is transmitted by the second connection unit to the external processing device.

A media processing device with a processing unit according to this aspect of the invention receives a command sent from the host computer, converts the command to a first executable command executed by the processing unit or a second executable command executed by an external processing device, and changes appropriately to a first operating mode in which the processing unit executes the first executable command, or a second operating mode in which the second executable command is transmitted to an external device. As a result, the host computer can control a media processing device and an external processing device having processing units that can execute commands different from the commands sent from the host computer. As a result, when the media processing device or external processing device is replaced, the existing host computer configuration can be used as is.

In another aspect of the invention, the media processing device also has an external device controller that determines if a command contained in data received by the first connection unit is a command executed by the external processing device. The conversion unit converts the command contained in data received by the first connection unit to the second executable command when the external device controller determines the command contained in data received by the first connection unit is a command for the external processing device.

When the command received from the host computer is a command for the external processing device, this aspect of the invention converts the received command to a second executable command. Because a command output from the host computer for execution by the external processing device is converted to a second executable command compatible with the external processing device, the external processing device can be operated as controlled by the host computer.

In a media processing device according to another aspect of the invention, when the external device controller determines the command contained in data received by the first connection unit is a command for the processing unit, the conversion unit converts the command contained in data received by the first connection unit to the first executable command.

When a command received from the host computer is to be executed by the processing unit, this aspect of the invention converts the command to a first executable command and the processing unit executes the process.

Another aspect of the invention is a POS system including a POS terminal that transmits data including a command; a first media processing device; and a second media processing device. The first media processing device includes a processing unit that processes a recording medium; a first connection unit that receives the data transmitted from the POS terminal; a conversion unit that converts a command contained in the data received by the first connection unit to a first executable command executed by the processing unit, or a second executable command different from the first executable command; a second connection unit that transmits data including the second executable command output by the conversion unit; and a control unit that, based on the command converted by the conversion unit, switches to a first operating mode in which the processing unit executes the first executable command, or a second operating mode in which data including the second executable command is transmitted from the second connection unit. The second media processing device including a receiving unit that connects to the second connection unit of the first media processing device and receives data including the second executable command transmitted from the second connection unit; and a media processing unit that performs a process common to the processing unit of the first media processing device based on data received by the receiving unit.

In this aspect of the invention, the first media processing device with a processing unit that processes a recording medium has a function for receiving a command sent from a POS terminal, and converting the received command to a first executable command executed by the processing unit or a second executable command executed by the second media processing device. After command conversion, the first media processing device can therefore perform a process based on the first executable command, or the second media processing device can execute the second executable command. As a result, the POS terminal can control first and second media processing devices that are compatible with a different command than the command transmitted by the POS terminal without changing the specifications of commands output by the POS terminal. As a result, when the first or second media processing device of a POS system is replaced, the existing POS terminal can still be used without being reconfigured.

Further preferably in a POS system according to another aspect of the invention, the first media processing device includes an external device controller that determines if a command contained in data received by the first connection unit is a command executed by the second media processing device; and the conversion unit converts the command contained in data received by the first connection unit to the second executable command when the external device controller determines the command contained in data received by the first connection unit is a command for the second media processing device.

When a command received from the POS terminal is a command to be executed by the second media processing device, this aspect of the invention converts the received command to a second executable command. Because commands used by the POS terminal that are to be executed by the second media processing device are thus converted to a second executable command for the second media processing device, the second media processing device can also be operated as controlled by the POS terminal.

Further preferably in a POS system according to another aspect of the invention, the processing unit of the first media processing device is a print unit that prints a receipt; and the media processing unit of the first media processing device prints a receipt as the process common to the processing unit.

This aspect of the invention enables printing receipts with the first media processing device and the second media processing device as a result of the POS terminal sending a command.

The invention enables a host computer to control and operate a media processing device and an external processing device that are compatible with commands different from commands output by the host computer without modifying host computer software.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the invention is described below with reference to the accompanying figures.

Figure 1:
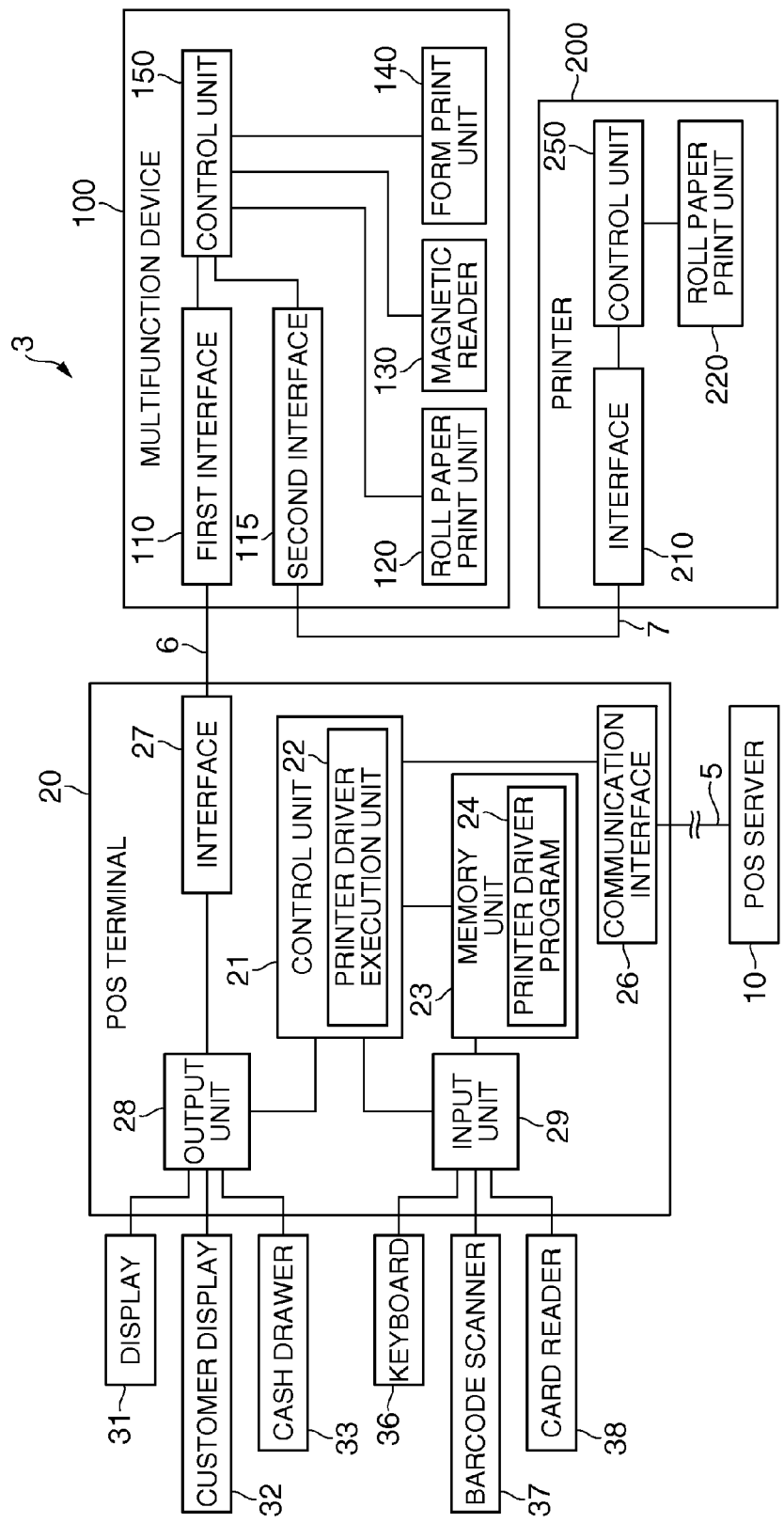
FIG. 1 is a function block diagram of a POS system according to a preferred embodiment of the invention.

FIG. 1 is a block diagram showing the configuration of a POS system 3 according to this embodiment of the invention.

The POS system 3 is typically installed in a retail store, for example, and used to register sales data, process transactions, and print receipts at the point of sale. The POS system 3 includes a POS terminal 20 (host computer) operated by an operator, a multifunction device 100 (media processing device, or first media processing device) connected to the POS terminal 20, and a printer 200 (external processing device, or second media processing device) connected to the multifunction device 100.

Connected to the POS terminal 20 are an operator display 31 that displays information for the operator, a customer display 32 that displays price and transaction information for the customer, a cash drawer 33 that holds cash and other payment instruments, a keyboard 36 that is used by the operator, a barcode scanner 37 used to read product barcodes, and a card reader 38 used to read magnetic information recorded on magnetic stripe cards such as credit cards and cash cards. The operator inputs product information by operating the keyboard 36 and using the barcode scanner 37 to read barcodes.

The POS terminal 20 then queries a POS server 10 based on the input product information. The POS server 10 searches a product master database based on the product information sent from the POS terminal 20, and returns product code, product name, price, and other product information from the master database to the POS terminal 20. The POS terminal 20 then displays product price information on the display 31 and customer display 32 based on the information returned from the POS server 10. When this process is completed for all products purchased in a transaction, the operator executes a transaction process by operating the keyboard 36, for example, and makes change from the cash drawer 33 as may be necessary. The POS terminal 20 then controls the multifunction device 100 or printer 200 to print and output a receipt.

The multifunction device 100 has a function for printing receipts on roll paper used as a recording medium. The multifunction device 100 also has a magnetic reader function for reading information magnetically recorded on checks and other forms, and a validation function for printing that a check or other form was used, for example. When a customer uses a check for payment in a sales transaction, the operator sets the check in the multifunction device 100 to read the magnetic information from the check. The multifunction device 100 then reads the magnetic information from the check and completes validation printing. The POS terminal 20 completes transaction processing based on the information read by the multifunction device 100.

The printer 200 has a function for printing receipts from roll paper. The multifunction device 100 and printer 200 could be thermal printers that print receipts on thermal roll paper, or serial dot impact or inkjet printers that print on plain roll paper.

The POS terminal 20 also has a control unit 21 that controls parts of the POS terminal 20. The control unit 21 includes CPU, RAM, ROM, and other peripheral circuits not shown, and runs a program stored in a memory unit 23. The control unit 21 includes a printer driver execution unit 22 that executes a printer driver program 24 stored in the memory unit 23.

The printer driver execution unit 22 generates and sends print data for printing receipts and commands telling a printer connected to the interface 27 to print. The printer driver execution unit 22 executes a printer driver program 24 that is written for a printer or a specific device from a specific manufacturer. As a result, the commands and print data generated by the printer driver execution unit 22 are commands and print data in the command set of a printer from a specific manufacturer or a specific model. The printer driver program 24 could also be a generic printer driver. More specifically, the commands and print data generated by the printer driver execution unit 22 are compatible with commands and print data in the command set of printers from plural different manufacturers or plural different models.

This embodiment of the invention describes an implementation in which the multifunction device 100 and the printer 200, or at least the printer 200, is incompatible with the printer driver program 24, or more specifically a situation in which at least the printer 200, and possibly both the multifunction device 100 and the printer 200, cannot execute the commands output by the printer driver execution unit 22.

This situation occurs, for example, when the printer driver program 24 is a dedicated printer driver program that is compatible with a multifunction device or printer of a different model or manufacturer than multifunction device 100 and printer 200, or the printer driver program 24 is a generic printer driver and the multifunction device 100 and printer 200, or the printer 200, require a dedicated printer driver program 24.

As shown in FIG. 1, the POS terminal 20 includes an output unit 28 with connectors (not shown in the figure) to which the operator display 31, customer display 32, and cash drawer 33 are connected. The output unit 28 outputs display data from the output unit 28 to the display 31 and customer display 32 as controlled by the control unit 21. The output unit 28 also outputs to the cash drawer 33 a signal that opens the cash drawer 33 as controlled by the control unit 21. The output unit 28 could also have a function for detecting the state (open or closed) of the cash drawer 33, and outputting the result to the control unit 21.

An interface 27 to which an external printer is connected is also connected to the output unit 28. The interface 27 has a connector (not shown in the figure) conforming to a particular standard such as USB, RS-232C, or Ethernet ®, and connects to a printer by a cable connected to this connector.

The interface 27 could also be a wireless communication interface enabling connecting a printer through a wireless connection. Examples of the wireless communication standard include IEEE 802.11, wireless USB, Bluetooth ®, and UWB. In this embodiment of the invention the interface 27 is connected to the multifunction device 100 through a cable 6. The POS terminal 20 and multifunction device 100 are connected 1:1.

The POS terminal 20 has a communication interface 26 connected to a communication line 5, and is connected to the POS server 10 through the communication interface 26. The communication interface 26 may include an Ethernet LAN interface, or a modem or other communication interface circuit.

The multifunction device 100 includes a first interface 110 (first connection unit) that connects to an external device, and a second interface 115 (second connection unit). The first interface 110 connects to the POS terminal 20 through the cable 6. The second interface 115 connects to the printer 200 through another cable 7. The first interface 110 connects 1:1 to the POS terminal 20, and the second interface 115 connects 1:1 to the printer 200.

The multifunction device 100 includes a control unit 150. The control unit 150 includes, for example, a CPU, RAM, ROM, and nonvolatile memory such as an EEPROM or flash memory device (not shown in the figure). The control unit 150 executes a program stored in nonvolatile storage to control other parts. This program could be firmware for operating the multifunction device 100.

The multifunction device 100 includes a roll paper print unit 120 (processing unit, first processing unit), a magnetic reader 130 (processing unit, second processing unit), and a form print unit 140 (processing unit, second processing unit) that operate as controlled by the control unit 150. More specifically, the multifunction device 100 is a multifunction device with a plurality of functions including a function for printing receipts, a function for reading magnetic information from forms, and a form printing function.

The control unit 150 exchanges data with the POS terminal 20 through the first interface 110, and exchanges data with the printer 200 through the second interface 115.

Not shown in the figures, the roll paper print unit 120 has a printhead for printing text and images on roll paper, a conveyance mechanism for conveying the roll paper, a cutter mechanism for cutting the roll paper, and detectors for detecting if roll paper is present and detecting the leading end of the roll paper. The roll paper print unit 120 prints on roll paper as controlled by the control unit 150, and outputs receipts.

The magnetic reader 130 reads information magnetically recorded on checks and other forms that are loaded by the operator. Though not shown in the figures, the magnetic reader 130 also has a conveyance mechanism that conveys the forms, and an MICR head that reads information (such as the MICR line) magnetically recorded on the conveyed form.

The form print unit 140 prints text indicating that a form has been processed, for example, on the form that is read by the magnetic reader 130. The form print unit 140 has a printhead not shown. The printhead is disposed to a position past which the form is conveyed by the conveyance mechanism of the magnetic reader 130, and prints on the conveyed form.

The printer 200 is a simple printer with a function for printing receipts. The printer 200 has an interface 210 connected to the multifunction device 100 through a cable 7, a roll paper print unit 220 (media processing unit) including a printhead that prints on the roll paper, and a control unit 250 that controls these other parts. The interface 210 is a wired interface with a connector (not shown in the figure) or a wireless interface conforming to the first interface 110 or second interface 115 described above. The control unit 250 exchanges data with the multifunction device 100 through the interface 210.

Figure 2:
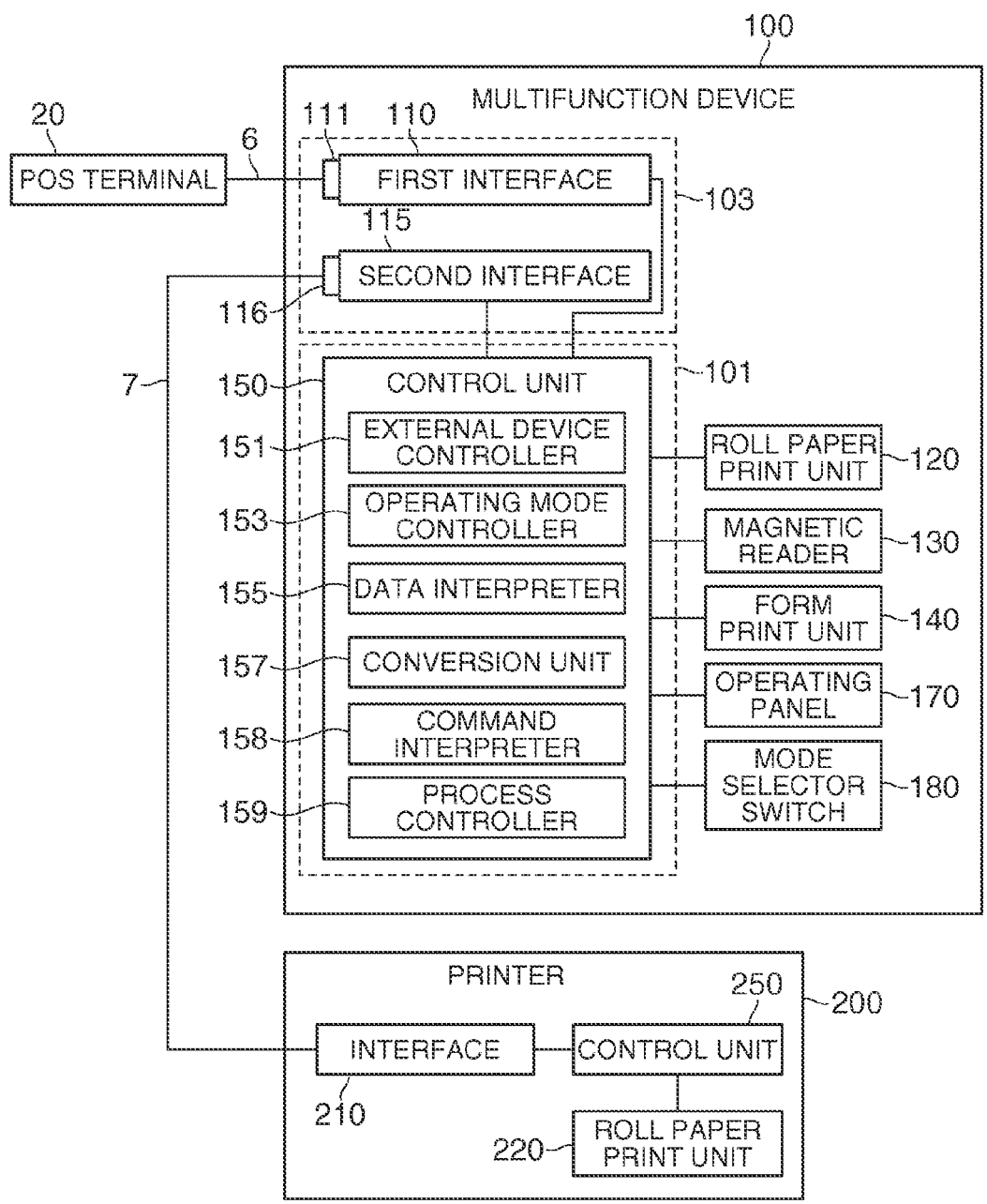
FIG. 2 is a function block diagram showing the configuration of a multifunction device in detail.

FIG. 2 is a function block diagram of the POS system 3 showing the configuration of the multifunction device 100 in detail.

As shown in FIG. 2, the multifunction device 100 has a main circuit board 101 containing a CPU and other components for controlling parts of the multifunction device 100, and an interface board 103 disposed separately from the main circuit board 101.

The interface board 103 is connected to the main circuit board 101 through a detachable bus (not shown in the figure), for example, and is removably installed in the multifunction device 100. The first interface 110 and second interface 115 are mounted on the interface board 103, and the control unit 150 is mounted on the main circuit board 101. The main circuit board 101 is also connected to the roll paper print unit 120, magnetic reader 130, form print unit 140, operating panel 170, and mode selector switch 180 of the multifunction device 100.

The first interface 110 has a connector 111 that can connect to the cable 6, and the second interface 115 has a connector 116 that can connect to the other cable 7. These connectors 111, 116 are separately disposed to the interface board 103. In one implementation, the connectors 111, 116 are disposed side by side exposed from the back of the multifunction device 100. The first interface 110 and second interface 115 can communicate separately of each other.

The connectors 111, 116 are connectors that conform to a particular standard such as USB, RS-232C, or Ethernet ®, and can connect to a compatible cable 6, 7.

Alternatively, the first interface 110 and second interface 115 could be wireless communication interfaces enabling connecting to the POS terminal 20 or printer 200 through a wireless connection. Examples of the wireless communication standard include IEEE 802.11, wireless USB, Bluetooth ®, and UWB.

The control unit 150 operates as a external device controller 151, operating mode controller 153 (switch unit), data interpreter 155, conversion unit 157, command interpreter 158, and process controller 159 by means of the CPU mounted on the main circuit board 101 running specific programs.

The external device controller 151 communicates with the device connected to the second interface 115, and determines the type of device (multifunction device or printer), model name, manufacturer, the command set compatible with the device (type of commands), and functions that the device can handle, for example. In this embodiment the external device controller 151 determines at least the types of processes that the device connected to the second interface 115 can execute. Preferably, the external device controller 151 determines the command set that the device connected to the second interface 115 uses.

The method whereby the command set is identified could include sending data querying the command set through the second interface 115 and deciding the command set based on the received responses, or identifying the command set of the device by determining the manufacturer or model name of the device connected to the second interface 115, for example. Because a printer 200 is connected to the second interface 115 in this embodiment, the external device controller 151 determines the command set used by the printer 200.

The operating mode controller 153 controls changing the operating mode of the multifunction device 100. When the POS terminal 20 outputs a command for a printing operation, the multifunction device 100 can operate in a first mode in which the multifunction device 100 prints, or a second mode in which the printer 200 is driven to print. The first mode and second mode are selected exclusively.

In other words, in the first mode the multifunction device 100 executes all commands that are received through the first interface 110 and relate to processes that can be executed by the multifunction device 100.

In the second mode, the multifunction device 100 passes commands that are received through the first interface 110 and are related to processes that can be executed by the device connected to the second interface 115 through the second interface 115 to the connected device. The multifunction device 100 executes commands related to processes that cannot be executed by the device connected to the second interface 115.

When a command for printing is received through the first interface 110 in the first mode, the multifunction device 100 prints with the roll paper print unit 120 based on the print data received with the command.

When a command for printing is received in the second mode through the first interface 110, the multifunction device 100 outputs the command and the print data received with the command from the second interface 115. The printer 200 then receives the print data and the print command through the interface 210, and prints with the roll paper print unit 220.

Switching between the first mode and second mode occurs when, for example, a text command is detected by the data interpreter 155 described below, when a mode selector switch 180 of the multifunction device 100 is operated, or when the operating mode is changed by an operation on the operating panel 170 of the multifunction device 100. The mode selector switch 180 is a switch disposed on an outside panel of the multifunction device 100, for example. The mode selector switch 180 could be a pushbutton, touch sensor, or toggle switch, for example. The operating mode controller 153 switches the current operating mode to the other operating mode each time the mode selector switch 180 is operated and turns on. The operating panel 170 includes switches (not shown in the figure) for controlling operation of the multifunction device 100, and indicators (not shown in the figure) that display the operating state of the multifunction device 100. When operation of a particular switch on the operating panel 170 is detected, the operating mode controller 153 changes the operating mode from the current operating mode to the other operating mode. An indicator (not shown in the figure) or display for displaying the current operating mode could also be disposed to the operating panel 170.

The data interpreter 155 interprets the text data contained in the print data received through the first interface 110, and determines if a text command is contained in the text data. A text command is a command contained in print data output by the POS terminal 20. The print data includes text data for printing text, and the text data is a string of text characters and symbols. The text characters and symbols contained in the text data are printed on the receipt and seen by the customer, and therefore typically constitute human-readable content. As a result, strings that do not contain specific meaning as words or symbols (including situations in which specific meaning is not represented by the string) are therefore not printed. For example, the string "$10" expresses a monetary value. However, the string "#1122" is a string with no meaning unless a specific meaning has been assigned to the hash mark (#) symbol. Because strings with no meaning are not printed on the receipt, they can be used as commands that can be interpreted by the multifunction device 100. Command that are thus sent to the multifunction device 100 as part of the text data contained in the print data are referred to as "text commands" herein.

A specific example of a text command is described next. In this example the string "#1122" is predefined as a command that tells the multifunction device 100 to change the operating mode. This predefined command is stored in the nonvolatile memory (not shown in the figure) of the control unit 150. The data interpreter 155 extracts text date from the print data received through the first interface 110, and looks for the string #1122 in the text data. If this string #1122 is found, the data interpreter 155 tells the operating mode controller 153 that a command to change the operating mode was detected. As a result, the operating mode controller 153 switches from the current operating mode to the other operating mode.

Text commands are output as part of the print data. As a result, new commands can be added without changing the command set (command language) used by the POS terminal 20. More specifically, the text data contained in the print data is generated by an application program that outputs print data to the printer driver program 24. The printer driver program 24 converts the print data generated by the application program to the data format used by the multifunction device 100, and outputs the converted data with a print command. Therefore, if the application program outputs print data containing a text command, the multifunction device 100 can operate according to the text command even if the printer driver program 24 does not recognize the text command. Desirable commands related to multifunction device 100 operation can therefore be added without changing the content of the printer driver program 24 run by the POS terminal 20.

If a text command is detected in the print data received by the first interface 110, the data interpreter 155 deletes the text command and generates new print data. This prevents printing meaningless strings on the receipt. The data interpreter 155 deletes text commands from the print data in both the first and second modes.

The conversion unit 157 converts the command received by the first interface 110 to a command of the same meaning in a different command set. As described above, the POS terminal 20 generates and outputs commands in a specific command set through a function of the printer driver program 24. The command set may vary according to the manufacturer and model of the device, including the multifunction device 100 and the printer 200. The command set output by the POS terminal 20 and the command set that can be executed by the multifunction device 100 and/or the printer 200 may therefore differ.

In this embodiment as described above, at least the printer 200, or both the multifunction device 100 and the printer 200, cannot execute commands output by the printer driver execution unit 22. In this situation the conversion unit 157 converts the commands output by the printer driver execution unit 22 so that the multifunction device 100 and printer 200 can be driven to execute processes instructed by the commands output by the printer driver execution unit 22.

The conversion unit 157 stores a table defining the correlation between commands in at least one command set and commands in another command set. The control unit 150 could store the table relating the command set of commands output by the POS terminal 20 and the command set that can be executed by the multifunction device 100. The control unit 150 could also store a table relating the command set of commands output by the POS terminal 20 and the command set that can be executed by the printer 200.

If a command received by the first interface 110 is not a command in a command set that can be executed by the multifunction device 100, the conversion unit 157 converts the command to a command (first executable command) in the command set that can be executed by the multifunction device 100. As a result, the multifunction device 100 can execute all commands received by the first interface 110.

When operating in the second mode and a command received by the first interface 110 is not a command in the command set executable by the printer 200, the conversion unit 157 converts the command (second executable command) to a command in the command set executable by the printer 200.

The external device controller 151 can identify commands that are executable by the printer 200. The commands output by the POS terminal 20 can therefore be executed in both the first mode and the second mode even if the command sets of the POS terminal 20 and the multifunction device 100 and/or printer 200 are not the same. As a result, if a printer in the POS system 3 is replaced by a multifunction device 100 or printer 200 of a different make or model, the multifunction device 100 or printer 200 can still be operated without changing the printer driver program 24.

When converting a command received by the first interface 110 to a command compatible with the printer 200, the conversion unit 157 may also change the content of the command or the content of the print data. For example, a printing parameter of the printer addressed by the printer driver program 24, such as the resolution of the printhead, the line feed distance, font size, font type, kerning, left and right margins of the roll paper, and the roll paper size, may differ from the parameter setting of the roll paper print unit 120 of the multifunction device 100, or the roll paper print unit 220 of the printer 200. Printing parameters may also differ between the roll paper print unit 120 and the roll paper print unit 220.

In this situation the conversion unit 157 changes the content of the commands and print data so that the same or similar printing results can also be achieved with a printer having different print parameters. For example, the conversion unit 157 may change commands or parameters, including the printing position command, the print margin command, line feed command, font selection command, or kerning command, contained in the commands received by the first interface 110 so that the roll paper print unit 120 produces the same or substantially the same printout as the printout produced by a printer that is compatible with the printer driver program 24. The conversion unit 157 could also convert the pixel count of image data contained in the print data. The conversion unit 157 also converts commands and parameters contained in the commands received by the first interface 110, or the pixel count of image data contained in the print data, so that the roll paper print unit 220 produces the same or similar results as a printer that is compatible with the printer driver program 24. As a result, the same or substantially the same printout can be produced using the multifunction device 100 and the printer 200 without modifying the software running on the POS terminal 20.

The command interpreter 158 interprets commands received by the first interface 110 and identifies the functions corresponding to the received commands. For example, the command interpreter 158 determines if a received command is a command related to a function of the roll paper print unit 120, a command related to a function of the magnetic reader 130, or a command related to a function of the form print unit 140.

If the command received by the first interface 110 is a command related to a function of the magnetic reader 130 or form print unit 140, the command interpreter 158 executes the received command using the process controller 159 described below.

If the command received by the first interface 110 is a command related to a function of the roll paper print unit 120, the command interpreter 158 determines the operating mode of the multifunction device 100. If the operating mode of the multifunction device 100 is the first mode, the command interpreter 158 causes the process controller 159 to execute commands related to the roll paper print unit 120. If the operating mode of the multifunction device 100 is the second mode, the command interpreter 158 sends the commands related to the roll paper print unit 120 through the second interface 115 to the printer 200. If the command received by the first interface 110 accompanies print data, the command interpreter 158 outputs the command and the print data from the second interface 115.

The process controller 159 executes commands received by the first interface 110 and drives the roll paper print unit 120, magnetic reader 130, and form print unit 140 to print a receipt, read magnetic information and print on a form.

Figure 3:
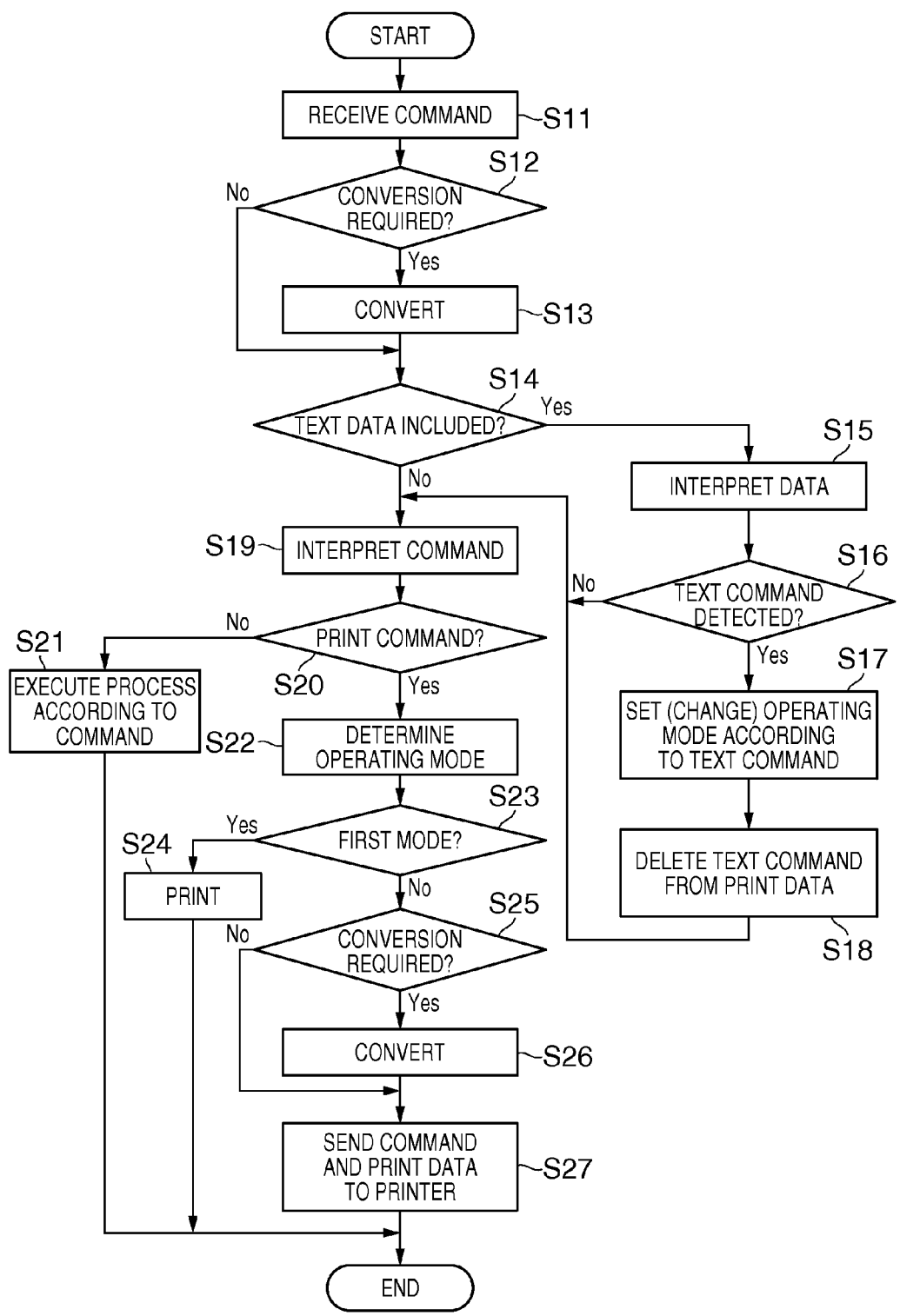
FIG. 3 is a flow chart showing the operation of the multifunction device.

FIG. 3 is a flow chart showing the operation of the multifunction device 100.

When the control unit 150 detects that a command was received by the first interface 110 (step S11), the conversion unit 157 determines if the received command must be converted (step S12). If the received command is different from the commands in the command set used by the multifunction device 100, the conversion unit 157 determines that command conversion is required (step S12 returns YES). In this event the conversion unit 157 converts the received command to a compatible command in the command set of the multifunction device 100 (step S13). The conversion unit 157 does not convert the command if command conversion is determined unnecessary (step S12 returns NO).

The data interpreter 155 then determines if text data was received with the command through the first interface 110 (step S14). If text data was received (step S14 returns YES), the data interpreter 155 interprets the received text data (step S15) and searches for a text command (step S16). If a text command is contained in the received text data (step S16 returns YES), the data interpreter 155 outputs the text command to the operating mode controller 153. The operating mode controller 153 then executes the process of changing (setting) the current operating mode to the other operating mode (step S17).

The data interpreter 155 then generates new text data by removing the text command output to the operating mode controller 153 from the received text data (step S18), and goes to the next step S19.

If a text command is not contained in the received text data (step S16 returns NO), the data interpreter 155 goes directly to step S19.

In step S19 the command interpreter 158 interprets the received command, and determines if the received command is a print command (step S20). If the received command is not a print command (step S20 returns NO), the command interpreter 158 outputs the command to the process controller 159, and the process controller 159 controls the magnetic reader 130 or form print unit 140 to execute the process called by the command (step S21).

If the received command is a print command (step S21 returns YES), the data interpreter 155 determines the operating mode set by the operating mode controller 153 (step S22). If the operating mode is the first mode (step S23 returns YES), the data interpreter 155 outputs the command to the process controller 159, and the process controller 159 controls the roll paper print unit 120 to print according to the print command (step S24).

If the operating mode is set to the second mode (step S23 returns NO), the conversion unit 157 determines if command conversion is required (step S25). Because commands are sent to the printer 200 in the second mode, the conversion unit 157 determines that command conversion is required if the command received by the first interface 110 is not a command used by the printer 200 (step S25 returns YES).

In this event the conversion unit 157 converts the command to a command in the command set used by the printer 200 (step S26), and sends the print command and the print data to the printer 200 through the second interface 115 (step S27).

If command conversion is not required (step S25 returns NO), the conversion unit 157 outputs the command and the print data received through the first interface 110 from the second interface 115. Note that the print data sent by the second interface 115 in step S27 is the print data received by the first interface 110 or the print data left after text command removal in step S18.

As described above, a POS system 3 according to this embodiment of the invention includes a POS terminal 20, a multifunction device 100, and a printer 200.

The multifunction device 100 includes a roll paper print unit 120 as a processing unit that processes roll paper used as a medium; a first interface 110 that receives data including a command sent from the POS terminal 20; a conversion unit 157 that converts a command contained in text data received by the first interface 110 to a first executable command that is executed by the roll paper print unit 120 or a second executable command that differs from the first executable command; and a control unit 150 that changes to a first operating mode causing the roll paper print unit 120 to execute a process based on the first executable command output by the conversion unit 157, or a second operating mode causing the second interface 115 to send the second executable command output by the conversion unit 157 to the printer 200.

The printer 200 includes an interface 210 that connects to the second interface 115 of the multifunction device 100 and receives the second executable command transmitted from the second interface 115; and a roll paper print unit 220 as a media processing unit that executes a process common to the roll paper print unit 120 of the multifunction device 100 based on data received by the interface 210.

Because the multifunction device 100 thus receives commands sent from the POS terminal 20, and has a function for converting a received command to a first executable command that the roll paper print unit 120 of the multifunction device 100 executes, or a second executable command that the printer 200 executes, the roll paper print unit 120 prints based on the first executable command resulting from conversion, or the roll paper print unit 220 of the printer 200 executes the second executable command.

When a multifunction device 100 or printer 200 that is compatible with commands other than the commands sent from the POS terminal 20 is used, the POS terminal 20 can still control the devices without modifying the specifications of commands output from the POS terminal 20. An existing POS terminal 20 can therefore be used without modification when a multifunction device 100 or printer 200 in the POS system 3 is replaced with a different model.

The multifunction device 100 also has an external device controller 151 that determines if a command contained in the data received from the POS terminal 20 is a command that is executed by the printer 200. If the external device controller 151 determines that the command received through the first interface 110 is a command for the printer 200, the conversion unit 157 converts the command contained in the data received by the first interface 110 to a second executable command. As a result, Because the multifunction device 100 thus converts the received command to a second executable command when the command received from the POS terminal 20 is a command executed by the printer 200, the printer 200 can be operated according to POS terminal 20 control.

Furthermore, because the conversion unit 157 of the multifunction device 100 converts commands received by the first interface 110 to second executable commands, the multifunction device 100 can still process roll paper based on commands sent from the POS terminal 20 even when the multifunction device 100 is connected to a POS terminal 20 that uses a different command set.

A specific example of how the POS system 3 may be used is described next. In a configuration having the multifunction device 100 and printer 200 in separate locations, the multifunction device 100 and printer 200 can be used differently. For example, when the operator is near the multifunction device 100, the operating mode of the multifunction device 100 is set to the first mode, and the POS system 3 uses the multifunction device 100 to print receipts. When the operator is away from the multifunction device 100 and is not near the multifunction device 100, the multifunction device 100 is switched to the second mode by sending a command from the POS terminal 20. In this scenario receipts are printed by the printer 200. The location where receipts are printed can thus be changed by changing the operating mode of the multifunction device 100.

The invention is described above with reference to a preferred embodiment thereof, but the invention is not limited thereto and can be modified and adapted in many ways without departing from the scope of the accompanying claims.

For example, the effect of the invention can also be achieved with configurations that do not include the function of one or more of the external device controller 151, operating mode controller 153, data interpreter 155, conversion unit 157, command interpreter 158, and process controller 159 of the multifunction device 100 in the embodiment described above. For example, in a device that connects to the second interface 115 and has information about the command set and types of processes that it can execute preset in the control unit 150, the printer 200 detection function of the external device controller 151 can be omitted.

Further alternatively, if the multifunction device 100 and printer 200 are compatible with the command set of the commands output by the POS terminal 20, the command conversion function of the conversion unit 157 can be omitted.

Further alternatively, the function of detecting text commands by means of the data interpreter 155 can be omitted in an implementation that does not use text commands and has a command whereby the POS terminal 20 tells the multifunction device 100 to change the operating mode defined in the same way as a print command, for example.

Yet further alternatively, when commands that are received by the first interface 110 and then passed on from the second interface 115 are set individually or by corresponding function in the control unit 150, the command interpretation function of the command interpreter 158 can be omitted because the operating mode controller 153 can send the command from the second interface 115 when the received command is one of these defined commands.

Yet further, because the operating mode can be changed by operating the mode selector switch 180 or operating panel 170 in the embodiment described above, the invention can also be used without using a text command or other command that commands changing the operating mode.

A configuration having a multifunction device 100 and printer 200 that print on roll paper is described above as an example of a media processing device and an external processing device that process media in the foregoing embodiment, but the invention is not so limited. For example, the media is plastic sheets and media with a coated surface can also be used. Other examples of usable media include cut-sheet media of a predefined size, and continuous media such as sprocket-feed paper. Photocopier paper can also be used as the media.

The roll paper print units 120, 220 are also not limited to thermal print units that print by applying heat to thermal paper, and could use other recording methods including inkjet and dot impact.

A magnetic reader 130 and form print unit 140 are also described in the foregoing embodiment as examples of non-printing process units of the multifunction device 100, but the invention is not so limited. For example, these other processing units could be print units that print on different types of media, a scanner that optically reads checks or other media, or an authentication unit that reads an IC card.

The POS system 3 in the foregoing embodiment has a multifunction device 100 with multiple functions connected to the POS terminal 20, and the printer 200 connected to the multifunction device 100, but the invention is not so limited. For example, an embodiment having the printer 200 connected to the POS terminal 20, and the multifunction device 100 or another printer 200 connected to the first printer 200, is also conceivable.

A POS terminal 20 is also described above as an example of a host computer, but the invention is not so limited. The host computer can be any device with the ability to send commands and text data to a multifunction device 100 or other media processing device, and could be a common personal computer, a mainframe computer, a server, or other computer device, or a mobile device. The application of the host computer is also not limited to transaction processing as a POS terminal, and the invention can also be used in systems including a computer that is used for common applications such as document processing and image editing, or for other specialized applications.

The function blocks shown in FIG. 1 and FIG. 2 can be desirably achieved by the cooperation of hardware and software, and do not suggest a specific hardware configuration.

For example, the function of the control unit 150 can be achieved by the control unit 150 of the multifunction device 100 running a program stored on an externally connected storage medium. The details of such a configuration can obviously also be changed as desired.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
a hardware processor that processes media;
a first interface that receives data including a command sent from a host computer;
a second interface through which data is transferred to and from an external processing device;
a converter configured to determine whether the command received by the first interface is different from all commands in a command set of the media processing device, the converter being further configured to convert the command to a first converted command compatible with the command set based on a result of the command determination;

a data interpreter configured to determine whether any text data received with the command through the first interface contains a text command, the data interpreter being further configured to send the text command to an operating mode controller that changes an operating mode of the media processing device based on a result of the text data determination;

a command interpreter that interprets the first converted command and identifies whether a function corresponding thereto is a first type of function or a second type of function; and a hardware controller configured to (i) execute the first converted command based on whether its function is identified as the first type of function, and (ii) determine the operating mode of the media processing device based on whether the function of the first converted command is identified as the second type of function;

wherein the command interpreter is further configured to send the first converted command to the hardware processor for execution based on whether the function of the first converted command is identified as the second type of function and whether the operating mode is determined to be a first operating mode; and wherein the converter is further configured to (i) determine whether the first converted command is compatible with the external processing device, and (ii) convert the first converted command to a second converted command that is compatible with the external processing device based on whether, the function of the first converted command is identified as the second type of function and whether the operating mode is determined to be a second operating mode the second converted command being sent along with the data by the second interface to the external processing device.

2. The media processing device described in claim 1, wherein:

the first type of function is a function not related to printing; and the second type of function is a function related to printing.

3. The media processing device described in claim 1, wherein:

the first operating mode is a printing mode; and the second operating mode is a pass-through mode.

4. A POS system comprising:

a POS terminal that transmits data including a command;

a first media processing device including
- a hardware processor that processes a recording medium,
- a first interface that receives the data including the command transmitted from the POS terminal,
- a second interface through data is transferred,
- a converter configured to determine whether the command received by the first interface is different from all commands in a command set of the first media processing device, the converter being further configured to convert the command to a first converted command compatible with the command set based on a result of the command determination,
- a data interpreter configured to determine whether any text data received with the command through the first interface contains a text command, the data interpreter being further configured to send the text command to an operating mode controller that changes an operating mode of the media processing device based on a result of the text data determination,
- a command interpreter that interprets the first converted command and identifies whether a function corresponding thereto is a first type of function or a second type of function, and
- a hardware controller configured to (i) execute the first converted command based on whether its function is identified as the first type of function, and (ii) determine an operating mode of the first media processing device based on whether the function of the first converted command is identified as the second type of function; and a second media processing device including
- a receiver that connects to the second interface of the first media processing device and receives data transmitted from the second interface, and
- a media processor that performs a process common to the hardware processor of the first media processing device;

wherein the command interpreter is further configured to send the first converted command to the hardware processor based on whether the function of the first converted command is identified as the second type of function and whether the operating mode is determined to be a first operating mode; and wherein the converter is further configured to (i) determine whether the first converted command is compatible with the external processing device, and (ii) convert the first converted command to a second converted command that is compatible with the external processing device based on whether the function of the first converted command is identified as the second type of function and whether the operating mode is determined to be a second operating mode, the second converted command being sent along with the data by the second interface to the second media processing device for operation by the media processor.

5. The POS system described in claim 4, wherein:

the first type of function is a function not related to printing; and the second type of function is a function related to printing.

6. The POS system described in claim 4, wherein:

the first operating mode is a printing mode; and the second operating mode is a pass-through mode.

7. The POS system described in claim 4, wherein:

the hardware processor of the first media processing device is embodied in a printer that prints a receipt; and printing is the common process of the printer and the media processor.

* * * * *